United States Patent [19]
Nose et al.

[11] Patent Number: 5,812,516
[45] Date of Patent: Sep. 22, 1998

[54] MAINTAINING INTERATOMIC DISTANCE BETWEEN AN STM PROBE AND A RECORDING LAYER

[75] Inventors: Hiroyasu Nose, Zama; Toshimitsu Kawase, Atsugi; Akihiko Yamano, Yokohama, all of Japan

[73] Assignee: Canon Kabushiki Kaisha, Tokyo, Japan

[21] Appl. No.: 475,465

[22] Filed: Jun. 7, 1995

Related U.S. Application Data

[62] Division of Ser. No. 465,908, Jun. 6, 1995, abandoned, which is a continuation of Ser. No. 800,716, Dec. 3, 1991, abandoned, which is a continuation of Ser. No. 326,677, Mar. 21, 1989, abandoned.

[30] Foreign Application Priority Data

Mar. 25, 1988 [JP] Japan .................................... 63-71036

[51] Int. Cl.⁶ .............................. G11B 9/00; G06K 17/00
[52] U.S. Cl. ............................................ 369/126; 250/306
[58] Field of Search ..................... 369/126, 101, 369/124, 112; 250/306, 307; 365/151, 128

[56] References Cited

U.S. PATENT DOCUMENTS

| | | | |
|---|---|---|---|
| 3,833,894 | 9/1974 | Aviram et al. | 365/107 |
| 4,032,901 | 6/1977 | Levinthal | 365/118 |
| 4,340,953 | 7/1982 | Iwamura et al. | 369/126 |
| 4,534,015 | 8/1985 | Wilson | 365/106 |
| 4,575,822 | 3/1986 | Quate | 365/174 |
| 4,724,318 | 2/1988 | Bennig | 250/306 |
| 4,813,016 | 3/1989 | Okada et al. | 365/107 |
| 4,829,507 | 5/1989 | Kazan et al. | 365/118 |
| 4,831,614 | 5/1989 | Duerig et al. | 369/101 |
| 4,851,671 | 7/1989 | Pohl | 250/306 |
| 4,878,213 | 10/1989 | Kazan et al. | 369/126 |
| 4,906,840 | 3/1990 | Zdeblick et al. | 250/306 |
| 4,945,515 | 7/1990 | Ooumi et al. | 369/126 |
| 4,962,480 | 10/1990 | Ooumi et al. | 369/126 |
| 4,998,016 | 3/1991 | Nose et al. | 250/306 |
| 5,152,805 | 10/1992 | Geddes et al. | 437/235 |
| 5,182,724 | 1/1993 | Yanagisawa et al. | 369/126 |
| 5,187,367 | 2/1993 | Miyazaki et al. | 369/126 |
| 5,453,970 | 9/1995 | Rust et al. | 369/101 |
| 5,513,168 | 4/1996 | Fujihira et al. | 369/126 |
| 5,535,185 | 7/1996 | Kishi et al. | 369/126 |
| 5,546,374 | 8/1996 | Kuroda et al. | 369/126 |

FOREIGN PATENT DOCUMENTS

| | | |
|---|---|---|
| 174860 | 3/1986 | European Pat. Off. . |
| 247219 | 2/1987 | European Pat. Off. . |
| 272935 | 6/1988 | European Pat. Off. . |
| 307211 | 3/1989 | European Pat. Off. . |

OTHER PUBLICATIONS

Stern et al., "Deposition and Imaging of Localized Charge no Insulator Surfaces Uing Force Microscope", Applied Physics Letter 53(26) Dec. 26, 1988, pp. 2717–2719, Dec. 1988.

*Primary Examiner*—David C. Nelms
*Assistant Examiner*—Kim-Kwok Chu
*Attorney, Agent, or Firm*—Fitzpatrick, Cella, Harper & Scinto

[57] ABSTRACT

An information recording system includes a recording medium, and a probe electrode provided at a location opposed to the recording surface of the recording medium. The probe electrode is capable of recording on the recording medium by application of a voltage between the probe electrode and the recording medium. An elastic member supports the probe electrode for motion relative to a base member arranged perpendicular to the recording surface. The distance between the recording surface and the probe electrode is adjustable by a mechanism provided for that purpose. The displacement of the probe electrode caused by an interatomic force acting between the recording medium and the probe electrode is detected, and a displacement signal based on the detected displacement is output. A control circuit feeds back the displacement signal so that the probe electrode can move back to its original position.

20 Claims, 5 Drawing Sheets

MAINTAINING INTERATOMIC DISTANCE BETWEEN AN STM PROBE AND A RECORDING LAYER

This application is a divisional of application Ser. No. 08/465,908, filed Jun. 6, 1995 now abandoned, which is a continuation of application Ser. No. 07/800,716, filed Dec. 3, 1991, now abandoned, which was a continuation of application Ser. No. 07/326,677, filed Mar. 21, 1989, now abandoned.

BACKGROUND OF THE INVENTION

1. Field of the Invention

This invention relates to an information recording device. More particularly, the present invention relates to an information recording device using an insulation recording medium having a layer structure of an organic compound between a pair of electrodes one of which is made a probe electrode, and exhibiting memory effect for the switching characteristic of voltage and current, and also relates to a device for reproducing the information recorded on the recording medium.

2. Related Background Art

In recent years, uses of memory materials have formed the nucleus of the electronics industries such as in computers and their related instruments, video discs, digital audio discs, etc., and developments of their materials are also under active progress. The performance demanded from memory materials may differ depending on uses, but may generally include:

(1) high density and large recording capacity;

(2) rapid response speed of recording and reproduction;

(3) small power consumption; and (4) high productivity and low cost;

Heretofore, semiconductor memories or magnetic memories employing magnetic material or semiconductor as the base material have been predominant, but with the advancement of laser techniques, inexpensive and high density recording media with optical memory using an organic thin film such as organic dye, photopolymer, etc. are now emerging in the field.

Also, the proposal of a molecular electronic device having, imparted to one organic molecule, the function of a logic element or memory element, etc. has been presented, and studies about Langumir-Blodaett film (hereinafter abbreviated as LB film), which may be regarded as one of the construction techniques of molecular electronic devices have been actively done. An LB film has laminated organic molecules deposited one molecular layer by one molecular layer, and the film thickness can be controlled in a unit of molecular length, whereby uniform and homogeneous ultrathin film can be formed. As preparation of the device by making full avail of this specific feature, many attempts have been made to use an LB film as the insulating film. For example, there are tunnel junction element with a metal-insulator-metal (MIM) structure [G. L. Larkins et al, Thin Solid Films, 99, (1983)], an electroluminescent element with a metal-insulator-semiconductor (MIS) structure [G. G. Roberts et al, Electronics Letters, 20, 489 (1984)], or a switching element [N. J. Thomas et al, Electronics Letters, 20, 838 (1984)]. According to these series of studies, the element characteristics have been investigated, but there still remain unsolved problems that reproducibility and stability are lacking, such as a variance or change with a lapse of time in characteristics in respective elements, etc.

In the prior art, the above investigations have been made primary about LB films of fatty acid which can be handled with relative ease. However, from organic materials which has been deemed to be inferior in heat resistance and mechanical strength, there are being developed heat-resistant and mechanically stronger organic materials one after another. We have studied intensively in order to prepare a MIM element excellent in reproducibility and stability by using an LB film by use of these materials as the insulator, and consequently could successfully prepare a thin and uniform dye insulating film not found in the prior art. Also, as a consequence, a MIM element capable of exhibiting the switching phenomenon having an entirely novel memory function has been discovered.

On the other hand, recently, a scanning type tunnel microscope (hereinafter abbreviated as STM) capable of observing directly the electron structure of the surface atoms of a conductor has been developed [G. Binnig et al, Helvetica Physica Acta, 55, 726 (1982)], and it has become possible to measure both single crystalline and amorphous materials with high resolving power of real space image. Besides, it has the advantage that observation can be made at low power without damaging the medium by applying the current. Further, it can be actuated in air and applied to various materials. Therefore a broad scope of applications is expected.

Also, on the other hand, an interatomic force microscope applying the technique of STM (hereinafter abbreviated as AFM) has been also developed [G. Binnig et al., Phys. Rev. Lett., 56, 930 (1986)], and it has become possible to obtain the uneven information on the surface similarly as in STM. Development of AFM in the future is desired, because measurement in the order of an interatomic distance is possible for insulating materials.

STM is based on the phenomenon that tunnel current flows when the probe and an electroconductive substance were made to approach to a distance of about 1 nm with a voltage applied therebetween. This current is very sensitive to the distance change between the probe and the electro-conductive substance. By scanning the probe so that the tunnel current may be maintained to be constant, the surface structure of the real space can be drawn and at the same time a variety of information about the total electron cloud of the surface atoms can be read.

In this case, the resolving power in the interplanar direction is about 1 Å. Therefore, by applying the principle of STM, it is possible to perform high density recording and reproduction sufficiently in the order of an interatomic distance (several Å). As the recording and reproducing method in this case, there have been proposed the methods in which recording is performed by changing the surface state of an appropriate recording layer by use of a particle ray (electron beam, ion beam) or a high energy electromagnetic wave such as X-ray or an energy ray such as visible light or UV-ray, etc., and reproduction is effected by STM, and the method in which a material having memory effect for the switching characteristics of voltage and current, for example, a π-electron type organic compound or a chalcogenide thin film is used as the recording layer, and recording-reproduction ane performed by use of STM, etc. (Japanese Patent Application No. 61-309433, No. 61-309434).

However, in the methods applying STM, it is difficult in principle to move a probe electrode at a constant distance relative to the recording medium having insulating property. Also, since most of the organic materials exhibit insulating or semi-insulating property, it is almost impossible to move a probe electrode at a constant distance relative to organic material recording medium at a thin thickness of several nm or more. In such cases, there is also the fear that the probe electrode may come into contact with the recording medium to be damaged.

Hence, if it were possible to detect recording of a recording medium by scanning with a probe electrode at a certain distance apart from the recording medium, the abrasion resistance of the probe electrode would be improved, and also a recording detection method and device improved in durability could be provided.

SUMMARY OF THE INVENTION

Accordingly, an object of the present invention is to provide an information recording device which is capable of performing a high density recording, in which intervals in the order of an interatomic distance are detectable, on a recording medium having electric memory effect.

The present invention provides an information recording device, comprising:

a) a recording medium;

b) a probe electrode capable of recording on the recording medium by applying a voltage between the electrode and the recording medium; and c) a displacement detecting means for detecting the force acting between the recording medium and the probe electrode as the displacement amount of the probe electrode when they are approximated to each other.

The present invention also provides an information recording device comprising:

a) a recording medium;

b) a probe electrode fixed on an elastic member capable of recording on the recording medium by applying a voltage between the electrode and the recording medium; and c) a displacement detecting means for detecting the force acting between the recording medium and the probe electrode as the displacement amount of the elastic member when they are approximated to each other.

The present invention also provides an information recording device comprising:

a) a recording medium;

b) a probe electrode fixed on an elastic member capable of recording on the recording medium by applying a voltage between the electrode and the recording medium;

c) a displacement detecting means for detecting the force acting between the recording medium and the probe electrode as the displacement amount of the elastic member when they are approximated to each other; and d) a position adjusting means for adjusting the distance between the recording medium and the probe electrode based on the above displacement amount.

The present invention further provides an information recording device comprising:

a) a recording medium;

b) a first electrode fixed on one surface of an elastic member capable of performing recording on the recording medium by application of a voltage between he electrode and the recording medium;

c) a third electrode for detecting tunnel current provided approximated to a second electrode provided on the other surface of the elastic member; and d) an adjusting means for adjusting the distance between the recording medium and the first electrode by detecting the force acting between the recording medium and the first electrode as the change in tunnel current flowing between the second electrode and the third electrode when they are approximated to each other.

In another aspect of the present invention, there is also provided an information recording process comprising:

the step of approximating a probe electrode to a recording medium comprising an electroconductive substrate and an organic thin film having an electric memory effect formed thereon;

the step of detecting the interatomic force acting between the atom of the organic thin film surface and the atom at the tip end of the probe electrode and maintaining the distance between the organic thin film surface and the probe electrode on the basis of such detection; and the step of applying a voltage not lower than the threshold value voltage which causes an electric memory effect between the electroconductive substrate and the probe electrode.

Further, the present invention provides an information recording process comprising:

the step of approximating a probe electrode to a recording medium comprising an electroconductive substrate and an organic thin film having an electric memory effect formed thereon;

the step of detecting the interatomic force acting between the atom of the organic thin film surface and the atom at the tip end of the probe electrode and maintaining the distance between the organic thin film surface and the probe electrode on the basis of such detection;

the step of applying a voltage not lower than the threshold value voltage which causes an electric memory effect between the electroconductive substrate and the probe electrode; and the step of measuring the current value by applying a voltage not higher than threshold value voltage which causes an electric memory effect between the electroconductive substrate and the probe electrode.

DETAILED DESCRIPTION OF THE PREFERRED EMBODIMENTS

Figure 1:
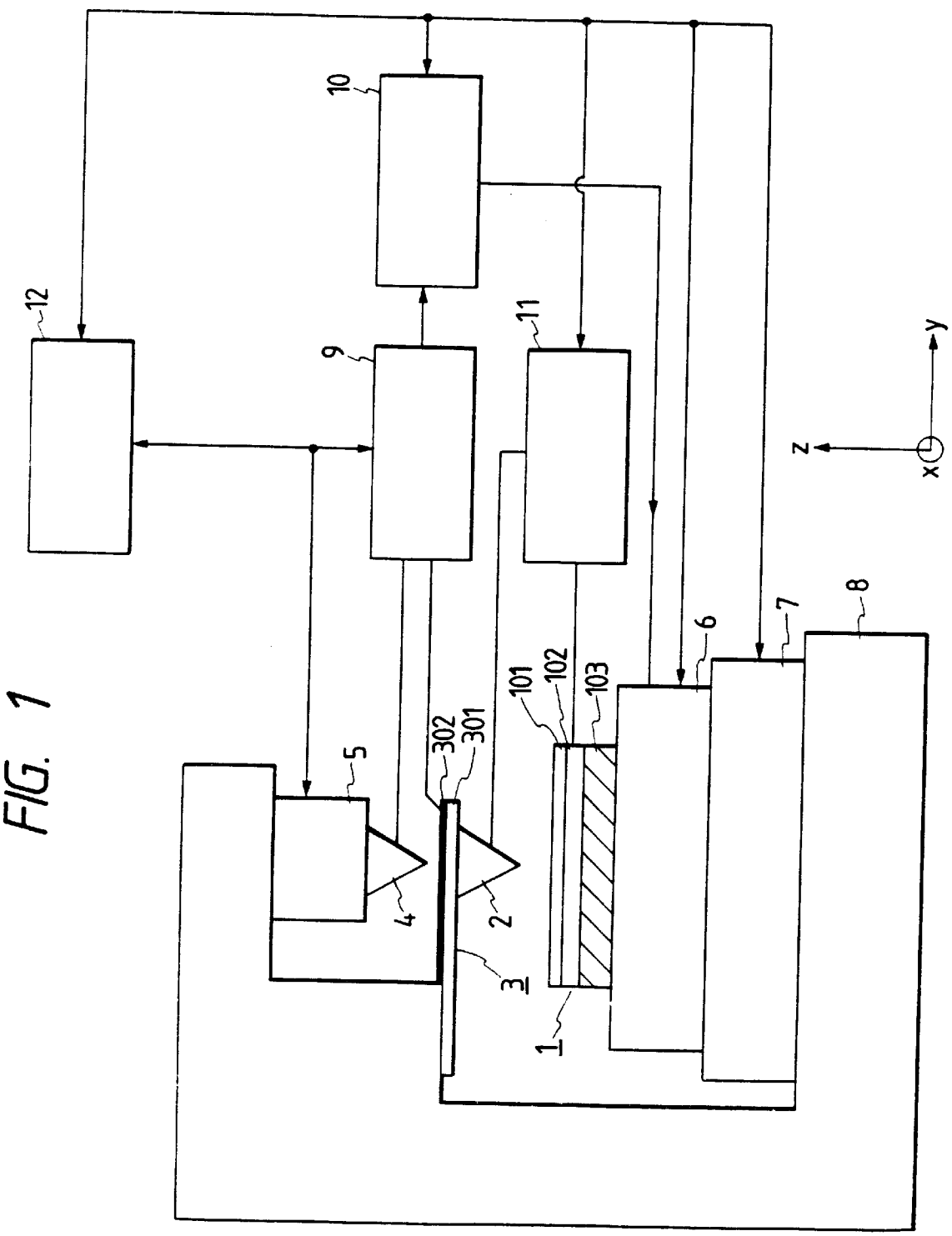
FIG. 1 is a schematic illustration of the information recording device of the present invention.

The present invention has been devised to perform position adjusting in the Z-axis direction of a probe electrode relative to a recording medium (namely control of an interspace between the recording medium and the probe electrode) by providing a detecting means of an interatomic force acting between a recording medium having an insulating property and a probe electrode, whereby no damage may occur through contact of the both. Also, since the probe electrode on which the interatomic force is acting also functions as the electrode for recording and reproduction on the recording medium, it becomes possible to effect high density recording and reproduction, in which intervals in the order of an interatomic distance are detectable.

The recording medium of the present invention, by employing an organic built-up film with molecules having a group having π-electron level and a group having only σ-electron level in combination laminated on an electrode, can exhibit a non-linear current-voltage characteristic different from the prior art by applying current by using a probe electrode orthogonal to the film surface.

Since most of organic materials generally exhibit insulating or semi-insulating properties, a remarkable diversity of applicable organic materials having a group having π-electron level are included in the present invention.

As the structure of the dye having π-electron system suitable for the present invention, there may be included, for example, dyes having porphyrine skeleton such as phthalocyanine, tetraphenylporphyrine, etc.; azulene type dyes having squarilium group and croconic methine group as the bonding chain and cyanine-like dyes having two or more nitrogen-containing heterocyclic rings such as quinoline, benzothiazole, benzoxazole, etc. bonded through squarilium group and croconic methine group; or cyanine dyes, condensed polycyclic aromatic compounds such as anthracene and pyrene, and chain compounds obtained by polymerization of aromatic ring and heterocyclic compounds; and polymers of diacetylene group; further derivatives of tetraquinodimethane or tetrathiafluvalene and analogues thereof and charge transfer complexes thereof; and further metal complex compounds such as ferrocene, trisbipyridine ruthenium complexes, etc.

Concerning formation of an organic recording medium, although the vapor deposition method or the cluster ion beam method may be applicable, an LB method is extremely suitable among the known techniques because of controllability, easiness and reproducibility.

According to the LB method, a monomolecular film of an organic compound having a hydrophobic site and a hydrophilic site in one molecule or a built-up film thereof can be formed easily on a substrate, which has a thickness on the molecular order and a uniform and homogeneous ultra-thin film can be supplied stably over a large area.

The LB method is a method in which a monomolecular film or its built-up film is prepared by utilizing the phenomenon that, in a molecule with a structure having a hydrophilic site and a hydrophobic site, when the balance of the both (amphiphilic balance) is brought to a proper value, the molecule will form a layer of monomolecule on the water surface with the hydrophilic group directed downward.

Examples of the group constituting the hydrophobic site may include various hydrophobic groups generally known widely such as saturated and unsaturated hydrocarbon groups, condensed polycyclic aromatic groups and chain polycyclic phenyl groups, etc. These may constitute the hydrophobic moiety each individually or as a combination of a plurality thereof. On the other hand, most representative as the constituent of the hydrophilic moiety are, for example, hydrophilic groups such as carboxyl group, ester group, acid amide group, imide group, hydroxyl group, further amino groups (primary, secondary, tertiary, and quaternaly), etc. These also constitute the hydrophilic moiety of the above molecule each individually or as a combination of a plurality thereof.

A dye molecule having these hydrophobic group and hydrophilic group in a well-balanced state and having π-electron system having an appropriate size can form a monomolecular film on the water surface, and it can be an extremely suitable material for the present invention.

Specific examples may includes the molecules as shown below.

[I] Croconic methine dyes:

1)

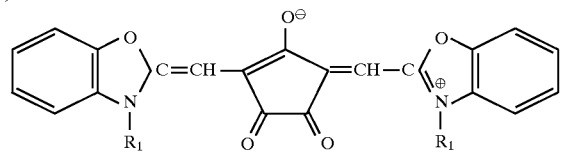

2)

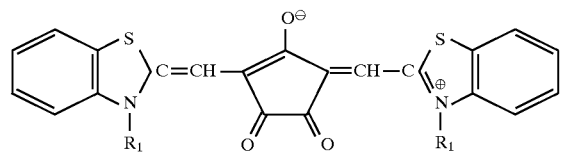

3)

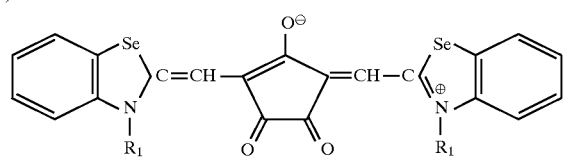

-continued
4)
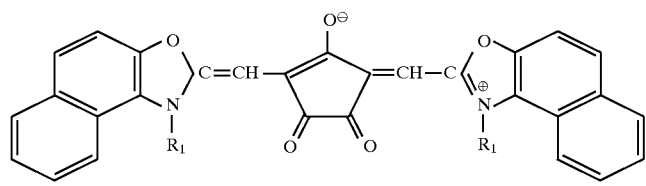
5)
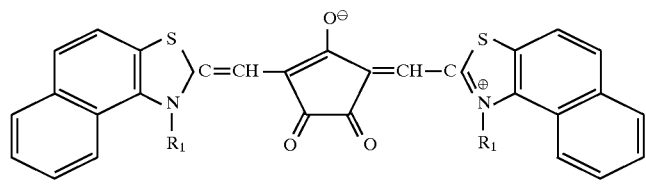
6)
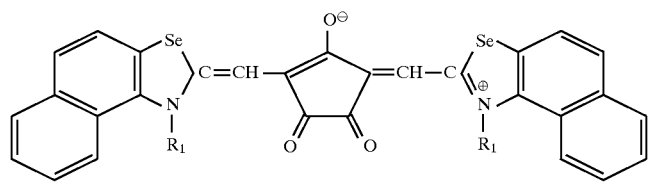
7)
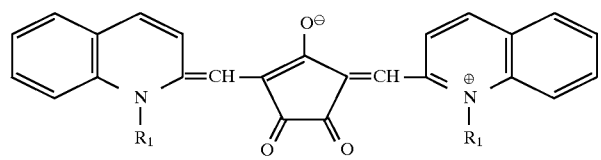
8)
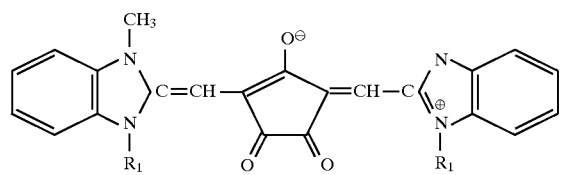
9)
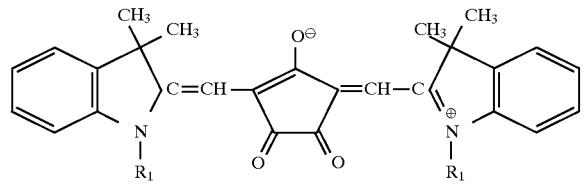
10)
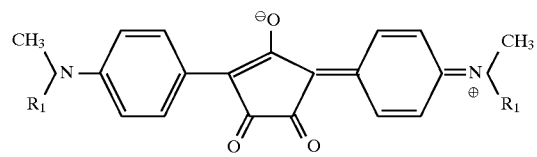

11)

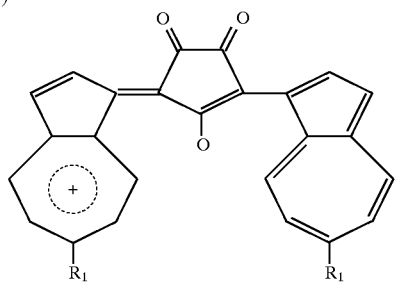

wherein $R_1$ corresponds to the group having π-electron level as mentioned above, and may be preferably a long chain alkyl group introduced with the carbon number n being 5<n<30 for making easier formation of the monomolecular film on the water surface. The compounds mentioned above as specific examples show only the basic structures, and various derivatives of these compounds are also suitable in the present invention, as a matter of course.

[II] Squarilium Dyes:

Compounds mentioned in [I] in which the croconic methine groups are replaced with the squarilium group having the following structure:

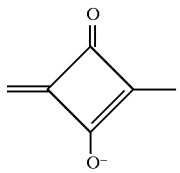

[III] Porphyrine type dye compounds:

1)

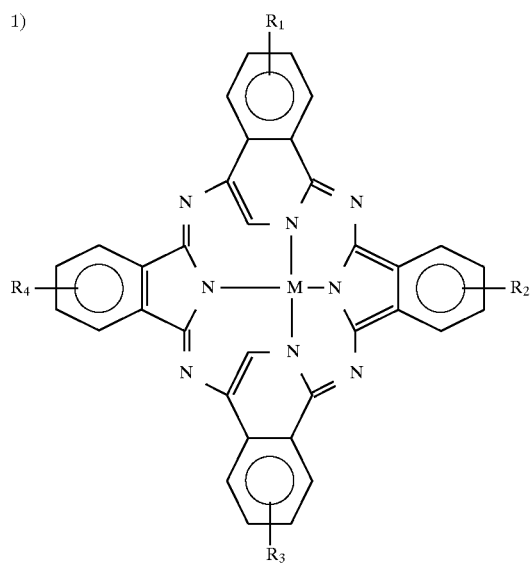

$R_1, R_2, R_3, R_4 =$ H.

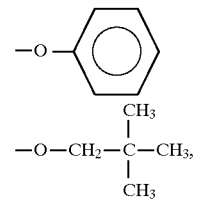

—$OC_5H_{11}$,
—$C(CH_3)_3$,
—$CH_2NHC_3H_7$
M = $H_2$, Cu, Ni, Al—Cl and rear earth metal ion

2)

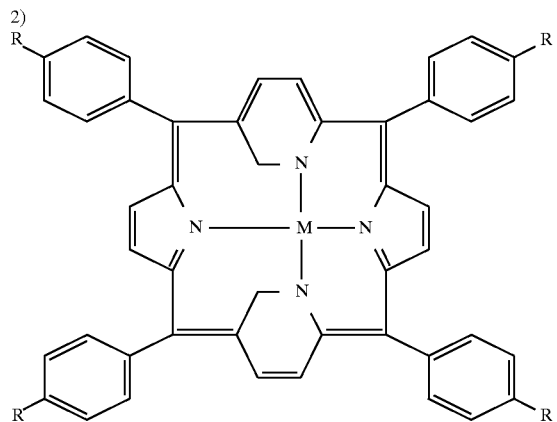

R = $OCH(COOH)C_nH_{2n+1}$
$5 \leq n \leq 25$
M = $H_2$, Cu, Ni, Zn, Al—Cl and rear earth metal ion

3)

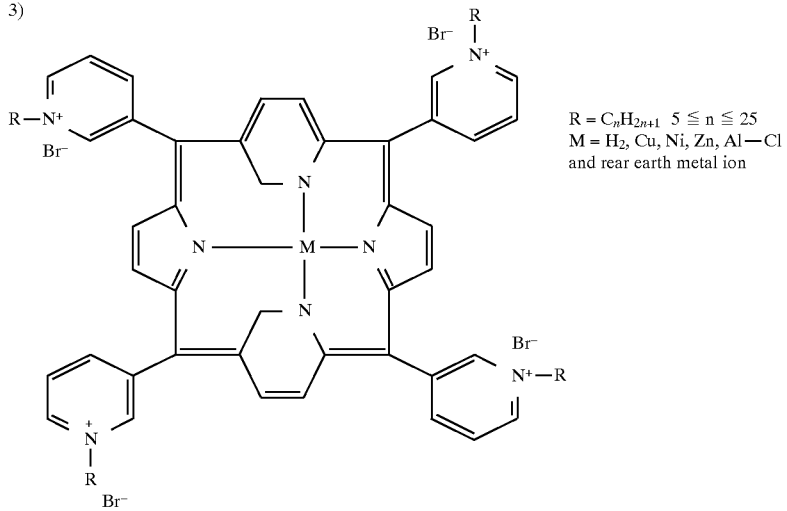

R = $C_nH_{2n+1}$  $5 \leq n \leq 25$
M = $H_2$, Cu, Ni, Zn, Al—Cl
and rear earth metal ion R is introduced for making easier formation of the monolecular film, and is not limited to the substituents mentioned here. On the other hand, $R_1$–$R_4$ correspond to the group having σ-electron level as mentioned above.

[IV] Condensed Polycyclic Aromatic Compounds:

R = $C_4H_9$ ~ $C_{12}H_{25}$ $C_nH_{2n}$COOH

σ ≤ N ≤ 20

N—(CH$_2$)n-COOH $$\underset{\text{anthracene}}{\text{C}}-\text{O(CH}_2\text{)n-COOH}$$

[V] Diacetylene Compounds:

$CH_3$−(CH$_2$)$_n$−C≡C−C≡C−(CH$_2$)$_m$−X

0 ≤ n, m ≤ 20

(with proviso n+m>10)

X is a hydrophilic group, and generally —COOH is used, but —OH, —CONH$_2$, etc. can be also used.

[VI] Others:

1)

Quinquethienyl

2)

CH$_3$(CH$_2$)$_4$—⬡—⬡—⬡—CN

3)

R = CON.HC$_{18}$H$_{37}$,
OCOC$_{17}$H$_{35}$

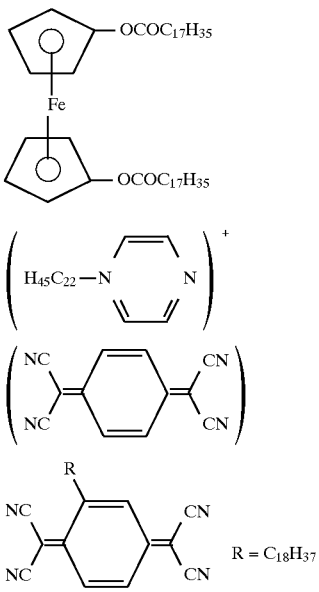

Dye materials suitable for the LB method other than those as mentioned above are of course suitable for the present invention. For example, biological materials of which study is becoming popular (e.g. bacteriorhodopsin or cytochrome c) or synthetic polypeptides (PBLG, etc.) and others may be also applicable.

Such amphiphilic molecule forms a monomolecular film with the hydrophilic group directed downward. The monomolecular layer on the water surface has the characteristics of the two-dimensional system. When the molecules are scattered sparsely, the following formula of the two-dimensional ideal gas is valid between the area per one molecule A and the surface pressure π:

$$\pi A = kT,$$

thus becoming "gas film". Here, k is the Boltzmann's constant and T is an absolute temperature. When A is made sufficiently small, intermolecular interactions are strengthened, whereby the molecules become "condensed film (or solid film)" of a two-dimensional solid. The condensed film can be transferred, one layer by one layer, onto the surface of any desired body having various materials and shapes such as glass or resin. By use of this method, a monomolecular film or built-up films thereof can be prepared, and used as the recording layer.

As a specific preparation method, the following method may be employed.

Figure 7:
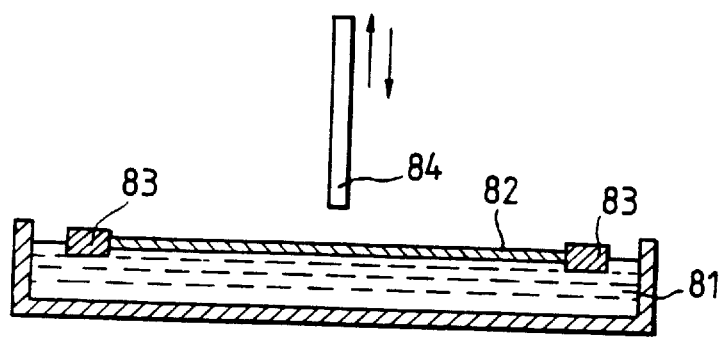
FIG. 7 is a schematic illustration of a film forming device of a built-up film.

A desired organic compound is dissolved in a solvent such as chloroform, benzene, acetonitrile, etc. Next, such solution is spread on an aqueous phase 81 by means of an appropriate device as shown in FIG. 7 in the accompanying drawings to form the organic compound in shape of a film.

Figure 8A:
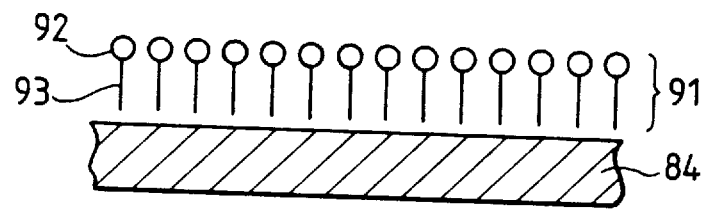
FIG. 8A and FIG. 8B are schematic illustrations of monomolecular film.

Subsequently, a partitioning plate (or a float) 83 is provided to prevent too broad expansion of the spreading layer 82 through free diffusion on the aqueous phase 81, whereby the spreading area of the spreading film 82 is restricted to control the gathered state of the film substance and obtain a surface pressure π in proportion to the gathered state. By moving this partitioning plate 83, the gathered state of the film substance can be controlled by reducing the spreading area, whereby the surface pressure can be gradually elevated to be set at a surface pressure suitable for preparation of the film. With the surface pressure kept constant, by moving vertically a clean substrate 84 gently, a monomolecular film of an organic compound is transferred onto the substrate 84. Such monomolecular film 91 is a film having molecules orderly arranged as shown in FIG. 8A or 8B.

The monomolecular film 91 can be thus produced, and a built-up film can be formed by repeating the above operation. For transfer of the monomolecular film 91 onto the substrate 84, other than the above vertical dipping method, such methods as the horizontal lifting method, the rotating cylinder method, etc., may be employed. The horizontal lifting method is a method in which transfer is effected with the substrate being contacted horizontally on the water surface, and the rotating cylinder method is a method in which the monomolecular layer is transferred onto the substrate surface by rotating a cylindrical substrate on the water surface.

Figure 8B:
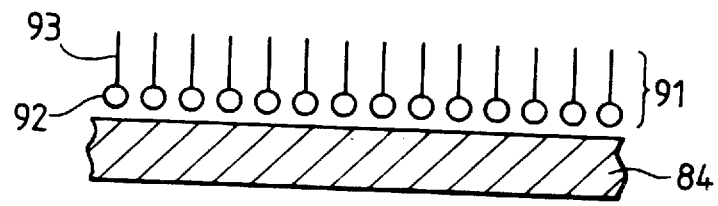
Figure 9A:
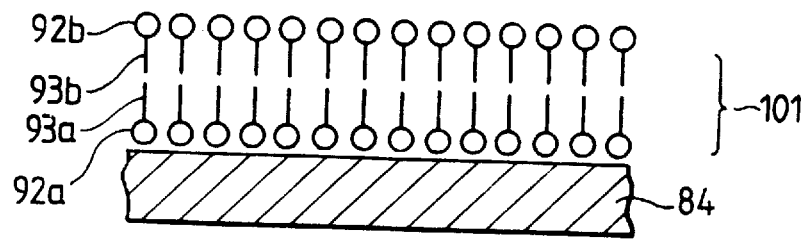
FIG. 9A, FIG. 9B and FIG. 9C are schematic illustrations of built-up films.
Figure 9B:
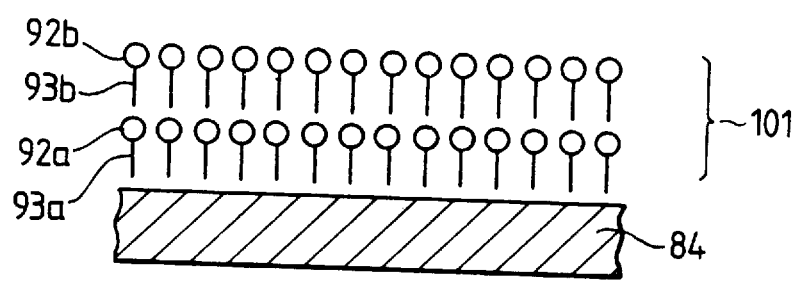
Figure 9C:
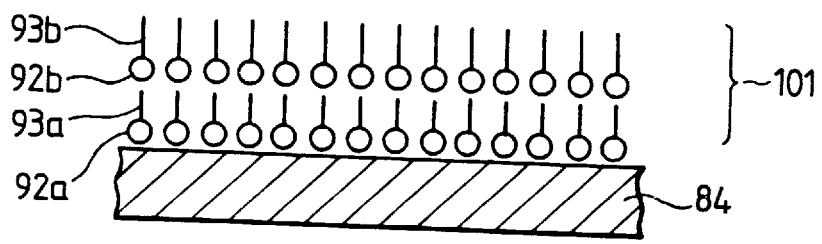

In the vertical dipping method as described above, when a substrate having a hydrophilic surface is withdrawn in the direction transversing the water surface, a monomolecular film 91 of the organic compound with the hydrophilic sites 92 of the organic compound directed toward the substrate 84 side is formed on the substrate 84 (FIG. 8B). When the substrate 84 is moved vertically, monomolecular films 91 are laminated one layer by one layer in the respective steps to form a built-up film 101. Since the direction of the film forming molecules in the withdrawing step becomes opposite to that of the dippig step, there is formed a Y type film according to this method in which the hydrophobic sites 93a and 93b of the organic compound are faced to each other between the respective layers (FIG. 9A). In contrast, in the horizontal lifting method, the monomolecular film 91 is formed on the substrate 84d with the hydrophobic site 93 of the organic compound faced toward the substrate 84 side (FIG. 8A). According to this method, even when the monomolecular film 91 may be built up, there is no change in direction of the film forming molecules, but there is formed an X type film in which the hydrophobic sites 93a and 93b are faced toward the substrate side in all or the layers (FIG. 9B). On the contrary, a built-up film 101 in which the hydrophilic sites 92a and 92b are faced toward the substrate 84 side is called a Z type film (FIG. 9C).

The method for transferring the monomolecular film 91 onto a substrate 84 is not limited to the above methods, but it is also possible to employ a method in which a substrate is extruded into an aqueous phase from a roll, when employing a large area substrate. The direction of the hydrophilic groups and the hydrophobic groups toward the substrate as described above are given as a general rule, and it can also be modified by the surface treatment of the substrate, etc.

As described above, a potential barrier layer comprising the monomolecular film 91 of an organic compound or its built-up film is formed on the substrate 84.

In the present invention, the substrate 84 for supporting the thin film comprising a lamination of the inorganic material and organic material may be any of metal, glass, ceramics, plastic materials, etc., and further a biological material with remarkably lower heat resistance can also be used.

The substrate 84 as described above may be in any desired shape, preferably in a flat plate, which is not limitative of the present invention at all. This is because the above film forming method has such advantage that the film can be formed exactly in accordance with the shape of the substrate surface independently of the shape of the substrate surface.

On the other hand, the electrode material to be used in the present invention may be one having high conductivity, including a large number of materials, typically metals such as Au, Pt, Ag, Pd, Al, In, Sn, Pb, W, etc. and alloys of these, further graphite or silicide, and further electroconductive oxides such as ITO, and application of these materials for the present invention may be contemplated. The method for forming electrode by use of such material may be sufficiently the known thin film forming technique. However, as the electrode material to be formed directly on the substrate, it is preferable to use an electroconductive material of which the surface will not form an insulating oxide film during formation of an LB film, for example a noble metal or an oxide conductor such as ITO.

The metal electrode of the recording medium is required if the recording layer in the present invention is insulating, but no such metal electrode is required if said recording layer exhibits semiconductive properties of MΩ or less. Thus, the recording layer itself can be used as the counter-electrode of the probe electrode.

Also, the tip end of the probe electrode is required to be sharpened so far as possible in order to enhance the resolving power of recording/reproduction/erasing. In the present invention, a probe prepared by implanting Si onto $SiO_2$ substrate by focused ion beam, effecting crystal growth of Si selectively on Si and then performing vapor deposition of Au for electroconductive treatment is employed, but the shape of the probe and the treatment method are not limited to these at all.

Figure 4:
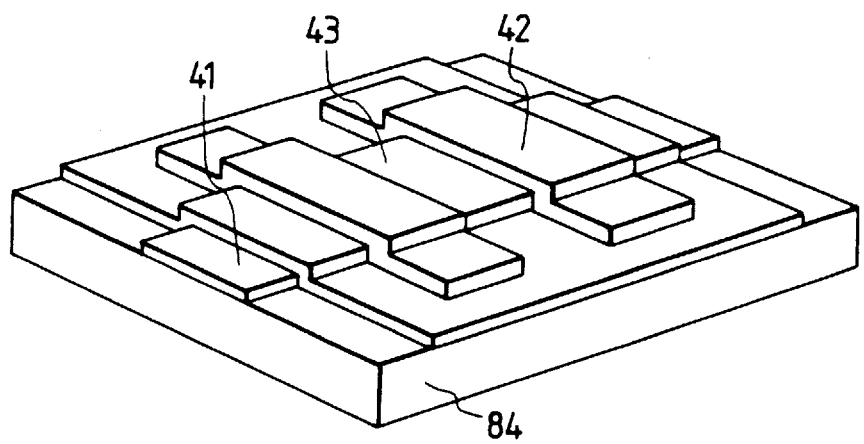
FIG. 4 is a schematic constitutional illustration of MIM device.
Figure 5:
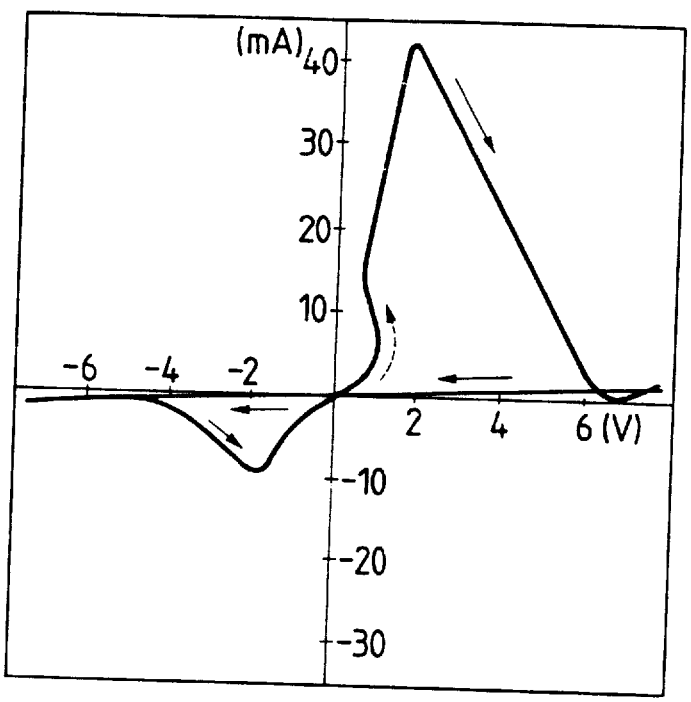
FIG. 5 and FIG. 6 are characteristic graphs exhibiting electrical characteristics obtained by the device shown in FIG. 4.
Figure 6:
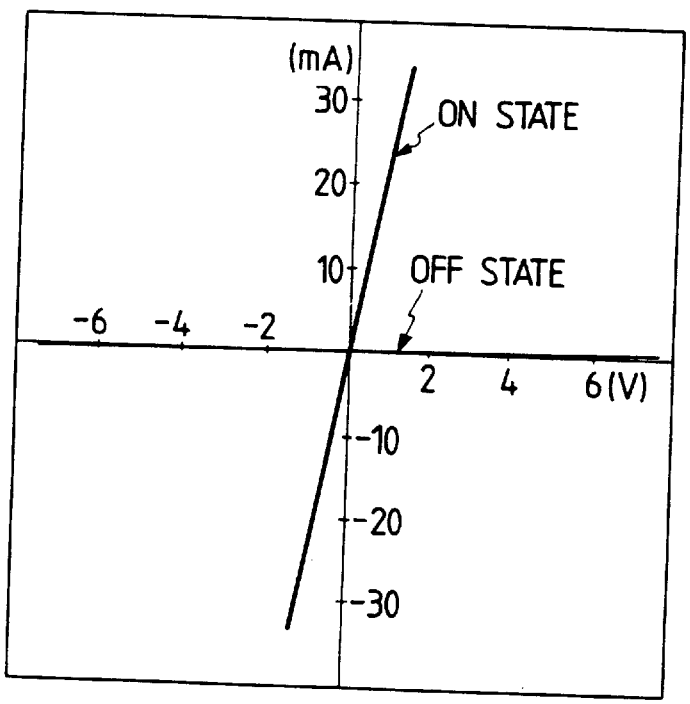

By use of the materials and the method as described above, a device with MIM structure as shown in FIG. 4 was prepared, whereby a memory switching device exhibiting the current-voltage characteristics as shown in FIG. 5 and FIG. 6 was obtained, and the two states (ON state and OFF state) were already found to have respective memory characteristics. These memory switching characteristics appear at the layer thickness of several Å to several 1000 Å, but the recording medium used with the probe electrode of the present invention should preferably have a layer thickness in the range of several Å to 500 Å, most preferably a layer thickness 10 Å to 200 Å.

In FIG. 4, 84 represents a substrate, 41 an AU electrode, 42 an Al electrode 43 a built-up monomolecular film as described above.

According to the present invention, when the recording medium and the probe electrode are approximated to each other, the interatomic force acting therebetween is detected by a force-displacement converter and a displacement amount detecting means, and the recording medium or the probe electrode is adjusted in the Z direction so that the interatomic force may become constant, namely the distance between the recording medium and the probe electrode may become a desired distance.

The force-displacement converter has a structure which supports the probe electrode with an elastic member and converts the force into displacement through its spring force. For example, provision of probe electrode at the center of beam or free end side of cantilever may be included. Also, as the material for beam, it is preferable to use a foil of Au, Ni, stainless steel (designated as SUS by the Japanese Industrial Standard), BeCuP, etc., and for making further fine beam, a thin film of $SiO_2$ frequently practiced in micromechanics may be employed.

As the displacement detecting means, there may be employed the laser interference method (heterodyne detection), the electrostatic capacity change detection method, the method by use of STM, etc.

Since interatomic force is very small, the masses of the probe electrode and the elastic supporting member should be made as small as possible, and for making the displacement greater, the elastic supporting member must be flexible, and also strong against external vibration.

Under the state adjusted in the distance between the recording medium and the probe electrode by the force-displacement converter and the displacement detecting means, a desired voltage is applied by the voltage applying circuit between the the probe electrode 2 and the subbing electrode 102 to perform recording/reproduction/erasing.

The present invention is described in more detail below by referring to Examples.

EXAMPLE 1

FIG. 1 is a block constitutional diagram showing the recording and reproduction device of the present invention Element 1 is a recording medium, and element 2 a probe electrode provided as opposed to the recording medium 1. Element 3 a cantilever on which the probe electrode 2 is mounted, and the probe electrode 2 can be displaced in the Z-aixs direction by the cantilever 3. On the back side of the cantilever 3 opposite to the probe electrode 2, there is a tunnel current detecting electrode 4, which electrode 4 is supported on a Z-axis driving device 5. Also, the medium 1 can be moved in the xy and z directions relative to the probe electrode 2 by means of a fine adjustment device 6, and further can be moved by an xyz rough movement device 7. The cantilever 3, the Z-axis driving device and the xyz rough movement device 7 are fixed on the base 8.

The base 8 is placed on an antivibration stand (not shown).

The recording medium 1 was prepared as described below.

After an optically ground glass plate (substrate 103) was washed with a neutral detergent and Trichlene, Cr as the subbing layer was deposited to 50 Å by the vacuum vapor deposition method, and further Au was deposited to 400 Å by the same method to form a subbing electrode (Au electrode 102).

Next, a chloroform solution having squarilium-bis-6-octylazulene (hereinafter abbreviated as SQAZ) dissolved therein at a concentration of 0.2 mg/ml was spread on an aqueous phase of 20° C. to form a monomolecular film on the water surface. By waiting for evaporation of the solvent, the surface pressure of such monomolecular film was enhanced to 20 mN/m, and further while maintaining this pressure constantly, the above electrode substrate was dipped gently at a speed of 5 nm,/min. so as to transverse through the water surface, and further drawn out to build up the Y-form monomolecular film of two layers. By repeating this operation for four times, a recording medium 1 having a recording layer 101 with 8 SQAZ layers built up was prepared.

The cantilever 3 was prepared by applying the etching technique of silicon. According to the anisotropic etching method utilizing highly the property of silicon crystal, a cantilever of $SiO_2$ with a length of 100 $\mu$m, a width of 20 $\mu$m and a thickness of 1 $\mu$m was prepared. This method is known. [K. E. Petersen, Proc. IEEE 70, 420 (1982)].

The probe electrode 2 was prepared by implanting Si ions on one end of the cantilever 301 of $SiO_2$ prepared by the above anisotropic etching by means of a focused ion beam apparatus, permitting Si crystal to grow selectively on the Si and vapor depositing Au to a thickness of 300 Å by the vacuum vapor deposition method. Also, on the back side of the cantilever 301 opposite to the probe electrode 2, Au was vapor deposited to 200 Å to form an electrode 302.

The tunnel current detecting electrode 4 was prepared by electrolytic grinding of a tungsten rod of 1 mm in diameter in a KOH solution. The radius of curvature of the tip end is 0.1 μmR or less.

The Z-axis driving device 5 effects monoaxial displacement by use of a piezoelectric element, which supports the above tunnel current detecting electrode 4 and can drive it in the Z-axis direction.

The xyz fine adjustment device 6 uses a cylindrical piezoelectric element, and fine adjustment of the recording medium 1 is possible in the x, y and z directions by applying any desired voltage. The possible fine adjustment control range is 0.1 nm to 1 μm for all of x, y and z, respectively, and the mechanical resolving power is 0.01 nm.

The xyz rough movement device 7 uses an xyz stage.

Next, the circuit constitution is to be described. The current voltage converter 9 is connected to the tunnel current detecting electrode 4 and the electrode 302 provided on one surface of the cantilever 3 located approximate thereto, and a bias voltage can be applied between the detecting electrode 4 and electrode 302 from a bias power source existing internally of the converter 9. The bias power source uses a cell, and can apply any desired voltage within the range of −1.5 V to +1.5 V. The converter 9 converts the tunnel current flowing between the tunnel current detecting electrode 4 and the electrode 302 to a voltage. Also, the converter 9 constitutes a part of the feedback loop including the control circuit 10. The control circuit 10 is connected to the xyz fine adjustment device 6, removes noise by processing of voltage signals from the current voltage converter 9 and also generates signals for controlling the displacement in the z direction. The recording reproduction erasing circuit 11 is connected to the subbing electrode 102 of the medium 1 and the probe electrode 2, and comprises a circuit for applying voltages for recording/reproduction/erasing between the probe electrode 2 and the subbing electrode 102 and a circuit for effecting current voltage conversion. These instruments, circuits are connected to a microcomputer 12 and controlled thereby.

Next, the experiment of recording/reproduction/erasing is to be described.

A bias voltage +100 mV (electrode 302 bias) is applied between the tunnel current detecting electrode 4 and the electrode 302 to move the Z-axis driving device 5 and stop it at the position where the tunnel current flowing between the tunnel current detecting electrode 4 and electrode 302 becomes 1 nA. Here, by driving the xyz rough movement device 7 and of the xyz fine adjustment device 6, Z-axis the medium 1 is approximated to the probe electrode 2. The position of xy may be at any desired position, where the recording layer 101 exists. When the medium 1 approaches toward the electrode 2 and comes to the distance as near as the electron cloud of the apex atom of the probe electrode 2 overlaps the electron cloud of the atom on the surface of the recording layer 101, interatomic force is generated. This force makes the cantilever 3 supporting the probe electrode 2 warped, By warping of the cantilever 3, the distance between the electrode 302 and the tunnel current detecting electrode 4 is changed, whereby the tunnel current set at 1 nA will be changed. The change in the tunnel current is feedbacked through the control circuit 10 to the Z-axis driving section of the xyz fine adjustment device 6 so that the current may be returned to the original 1 nA. By maintaining this state, the probe electrode 2 can be always at a constant distance relative to the recording layer 101.

Thus, when the xyz fine adjustment device 6 performs x, y scanning, the surface of the recording layer 101 can move maintaining a constant distance between the probe electrode 2 and the recording layer 101.

When the current value was measured by applying a voltage of 1.5 V which voltage being not more than the threshold value voltage to cause an electric memory effect between the probe electrode 2 and the Au electrode 102, OFF state was exhibited at a current of μA or less. Then, after a triangular wave pulse voltage having the wave form shown in FIG. 2 which voltage being not lower than the threshold value voltage $V_{th.ON}$ to cause an ON state was applied between the probe electrode 2 and the Au electrode 102, the current value was measured by applying again a voltage for reading of 1.5 V. As the result, an ON state of about 0.7 mA was exhibited. Then, the triangular wave pulse voltage shown in FIG. 3 which voltage being not lower than the threshold value voltage $V_{th.OFF}$ to cause a change from an ON state to an OFF state was applied, and then the current value was measured under applying again 1.5 V. As the result, returning to an OFF state was confirmed at a current of μA or less.

Figure 2:
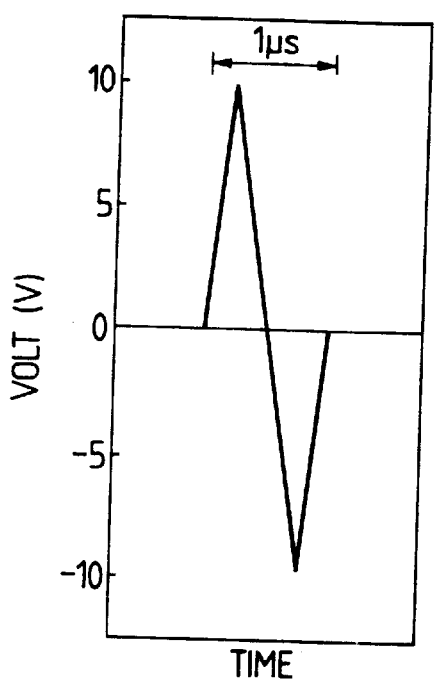
FIG. 2 is a pulse voltage waveform chart for recording.
Figure 3:
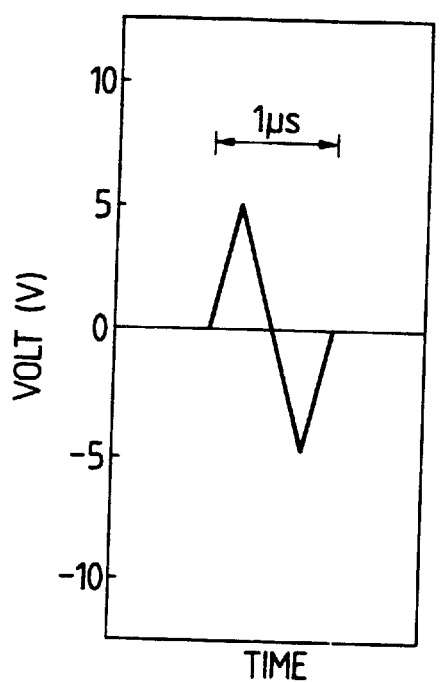
FIG. 3 is a pulse voltage waveform for erasing.

Next, while maintaining a constant distance between the probe electrode 2 and the recording layer 101 similarly as described above, and moving the xyz fine adjustment device 6 at each an equal interval of 100 nm in the x direction, a pulse voltage not lower than the threshold value voltage $V_{th.ON}$ having the wave form of FIG. 2 was applied between the probe electrode 2 and the Au electrode 102 to write the ON state. Then, upon applying voltage of 1.5 V for reading between the probe electrode 2 and the subbing electrode 102 and moving the device 6 similarly in the x direction, the current value flowing through the ON state region and the OFF state region could be read. In this Example, it was confirmed that the probe current flowing through the ON state region was changed by 1,000 times or more as compared with that on the state before recording or the OFF state region. Further, when on the recorded position a voltage of 10 V not lower than the threshold value voltage $V_{th.OFF}$ between the both electrodes was applied, it was also confirmed that all the recorded states were erased to become the OFF state. Also, after performing recording/reproduction/erasing at various pitches from 0.001 μm to 0.1 μm, the resolving power of 0.01 μm or less was measured. After the experiment, the probe electrode 2 was observed by Scanning Electron Microscope (SEM) and as the result no damage caused by a contact between the medium and the probe was observed.

Also, the probe electrode was improved in repeated use.

EXAMPLE 2

The experiments were carried out also for a recording media being different number of SQAZ layer other than that of SQAZ 8 layers in Example 1. The results are shown in Table 1.

As is apparent from Table 1, according to the present apparatus, recording/reproduction can be performed with sufficient resolving power, and, in addition, for any film thickness, no damage caused by contact between the medium and the probe appeared similarly as the result in Example 1, and also repeated use could be confirmed to be improved.

EXAMPLE 3

The experiments were carried out in the same manner as in Example 1, except for using t-butyl derivative of lutetium diphthalocyanine [LUH(Pc)$_2$] in place of the SQAZ recording medium used in Examples 1 and 2. The results are summarized in Table 1.

Similarly to SQAZ, recording and its reading out can be done with sufficient signal-to-noise (S/N) ratio, and moreover, according to the instant device even if the medium may be changed, recording/reproduction can be done without damage caused by contact between the medium and the probe at all.

The built-up conditions with respect to t-butyl derivative of $LuH(Pc)_2$ are as follows.

Solvent: chloroform/trimethylbenzene/acetone (1/1/2)

Concentration: 0.5 mg/ml

Aqueous phase: pure water, water temperature 20° C.

Surface pressure: 20 mN/m, dipping and drawing out speeds of the substrate 3 mm/min.

The cantilever of $SiO_2$ used as the elastic member is not limitative of the present invention, but various forms of beam or thin film structure may be conceivable, and also as the material, foils of Au, Ni, SUS, BeCu may be available. Anyway, one having an elastic constant of 0.1 to 1 N/m which can be displaced with a fine force is desirable. When a material of high electroconductivity is used for the elastic member, the probe electrode 2 and the electrode 302 can be handled as the common electrode.

In the example there is adopted a method to read out a change in tunnel current, for detecting the displacement any other methods capable of detecting minute change such as

TABLE 1

| Organic Compound | Built-up number | a region | | | b region | | | Resolving Power | Damage of probe and medium |
| --- | --- | --- | --- | --- | --- | --- | --- | --- | --- |
| | | Record-ability | ON/OFF ratio | Erasability | Record-ability | ON/OFF ratio | Erasability | | |
| SOAZ | 2 | ◎ | ○ | ◎ | ◎ | ◎ | ◎ | 0.01μ or less | none |
| | 4 | ◎ | ○ | ◎ | ◎ | ◎ | ◎ | 0.01μ or less | none |
| | 8 | ◎ | ◎ | ◎ | ◎ | ◎ | ◎ | 0.01μ or less | none |
| | 12 | ◎ | ◎ | ◎ | ◎ | ◎ | ◎ | 0.01μ or less | none |
| | 20 | ○ | ◎ | ◎ | ○ | ◎ | ◎ | 0.1μ or less | none |
| | 30 | ○ | ◎ | ◎ | △ | ◎ | ◎ | 0.1μ or less | none |
| $LuH(Pc)_2$ | 2 | ◎ | △ | ◎ | ◎ | ○ | ◎ | 0.03μ or less | none |
| | 4 | ◎ | ○ | ◎ | ◎ | ◎ | ◎ | 0.03μ or less | none |
| | 8 | ◎ | ○ | ◎ | ◎ | ◎ | ◎ | 0.03μ or less | none |
| | 12 | ◎ | ◎ | ◎ | ◎ | ◎ | ◎ | 0.03μ or less | none |
| | 20 | ○ | ◎ | ◎ | △ | ◎ | ◎ | 0.1μ or less | none |
| | 30 | △ | ◎ | ◎ | △ | ◎ | ◎ | 0.1μ or less | none |

Evaluation was performed overall from the recording and erasing characteristics after applying the pulse voltage and the erasing voltage, further the ratio of the current value under the recording state to that of the erased state (ON/OFF) and the resolving ability, and those with particularly good results were rated as ◎, those with excellent results as ○, and those with relatively somewhat lower results as compared with other as △.

In the Examples as described above, the LB method was used for formation of the dye recording layer, but a film forming method capable of preparing a very thin and uniform film may be available without limitation to the LB method, and specifically the vacuum vapor deposition methods such as Molecular Beam Epitaxy (MBE) and Chemical Vapor Deposition (CVD) method may be included.

The available materials are also not limited to other organic compounds, but inorganic materials such as chalcogenide compounds, etc. are also applicable.

Further, semiconductors can be also used as the electrode on the recording medium side, with the electrode and the recording layer being integrated.

The present invention is not limited in substrate material, its shape and surface structure at all.

On the other hand, any of the material having electroconductivity is applicable for the probe electrode in the present invention. Also, a wire material such as platinum wire can be used as bent in 90° so that it can also function as a cantilever.

the electrostatic capacity change detecting method and the laser interference method (heterodyne detection) may be used.

As the xyz fine adjustment device, a cylindrical piezoelectric element was used, but a piezoelectric element of the tripod type or the bimorph type may be also available.

As described above, by providing a detecting means of interatomic force acting between the recording medium and the probe electrode, and performing recording, reproduction and erasing with said probe electrode while adjusting the position between the recording medium and the probe electrode, the information recording reproduction device of high reliability can be provided, which can effect entirely new recording and reproduction capable of recording of by far higher density also as compared with optical recording and yet is free from damages to the recording layer and the probe electrode.

What is claimed is:

1. An information recording system comprising:
   a) a recording medium having a recording surface;
   b) a probe electrode provided at a location opposed to the recording surface of said recording medium, capable of recording on said recording medium by application of a voltage between said probe electrode and said recording medium;

c) an elastic member supporting said probe electrode so that said probe electrode can move relative to a base member in the direction perpendicular to the recording surface;

d) adjusting means for adjusting the distance between the recording surface and the probe electrode;

e) detecting means for detecting the displacement of said probe electrode caused by an interatomic force acting between said recording medium and said probe electrode and outputting a displacement signal based on the detected displacement; and f) a control circuit for feedbacking the displacement signal so that said probe electrode can move back to its original position.

2. An information recording system according to claim 1, wherein said detecting means comprises a detection electrode provided on said elastic member, a second probe electrode provided on said base member at a second location opposed to said elastic member, a bias voltage source for applying a bias voltage between said detection electrode and said second probe electrode, and a current detector for detecting a tunnel current flowing between said detection electrode and said second probe electrode.

3. An information recording system according to claim 1, wherein said detecting means comprises means for detecting a change of electrostatic capacity.

4. An information recording system according to claim 1, wherein said detecting means comprises means utilizing a laser interference method.

5. An information recording system according to claim 1, wherein said adjusting means comprises a driving device for moving said recording medium relative to the base member in the direction perpendicular to the recording surface.

6. An information recording system according to claim 1, wherein said elastic member comprises a cantilever fixed to the base member at one end and said probe electrode is provided on the other end of the cantilever.

7. An information recording system according to claim 1, wherein the system further comprises a voltage source for applying a pulse voltage corresponding to information between said probe electrode and said recording medium.

8. An information recording system according to claim 7, wherein said voltage source has a function of erasing information recorded on the recording medium by applying a second pulse voltage with a different voltage value than the pulse voltage.

9. An information recording system according to claim 1, wherein the system further comprises a driving device for relatively moving said probe electrode and said recording medium in the direction parallel to the recording surface.

10. An information recording system according to claim 1, wherein said recording medium comprises a substrate and a recording layer provided on said substrate, said recording layer having a memory effect selectively holding a first state and a second state different in current-voltage characteristic from each other and exhibiting transition from the first state to the second state by application of a voltage.

11. An information recording system according to claim 10, wherein said recording layer comprises a thin film of an organic compound having a $\pi$-electron level and a $\sigma$-electron level.

12. An information reproducing system comprising:

a) a recording medium having a recording surface on which information is recorded;

b) a probe electrode provided at a location opposed to the recording surface of said recording medium;

c) a bias voltage source for applying a bias voltage between said probe electrode and said recording medium;

d) reproducing means for reproducing information recorded on the recording surface by detecting a tunnel current flowing between said probe electrode and said recording medium;

e) an elastic member supporting said probe electrode so that said probe electrode can move relative to a base member in the direction perpendicular to the recording surface;

f) adjusting means for adjusting the distance between the recording surface and the probe electrode;

g) detecting means for detecting the displacement of said probe electrode caused by an interatomic force acting between said recording medium and said probe electrode and outputting a displacement signal based on the detected displacement; and h) a control circuit for feedbacking the displacement signal to so that said probe electrode can move back to its original position.

13. An information reproducing system according to claim 12, wherein said detecting means comprises a detection electrode provided on said elastic member, a second probe electrode provided on said base member at a second location opposed to said elastic member, a second bias voltage source for applying a bias voltage between said detection electrode and said second probe electrode, and a current detector for detecting a tunnel current flowing between said detection electrode and said second probe electrode.

14. An information reproducing system according to claim 12, wherein said detecting means comprises means for detecting a change of electrostatic capacity.

15. An information reproducing system according to claim 12, wherein said detecting means comprises means utilizing a laser interference method.

16. An information reproducing system according to claim 12, wherein said adjusting means comprises a driving device for moving said recording medium relative to the base member in the direction perpendicular to the recording surface.

17. An information reproducing system according to claim 12, wherein said elastic member comprises a cantilever fixed to the base member at one end and said probe electrode is provided on the other end of the cantilever.

18. An information reproducing system according to claim 12, wherein the system further comprises a driving device for relatively moving said probe electrode and said recording medium in the direction parallel to the recording surface.

19. An information reproducing system according to claim 12, wherein said recording medium comprises a substrate and a recording layer provided on said substrate, said recording layer having a memory effect selectively holding a first state and a second state different in current-voltage characteristic from each other and exhibiting transition from the first state to the second state by application of a voltage.

20. An information reproducing system according to claim 19, wherein said recording layer comprises a thin film of an organic compound having a $\pi$-electron level and a $\sigma$-electron level.

* * * * *

UNITED STATES PATENT AND TRADEMARK OFFICE
CERTIFICATE OF CORRECTION

PATENT NO. : 5,812,516
DATED      : September 22, 1998
INVENTOR(S): HIROYASU NOSE, ET AL.

It is certified that error appears in the above-identified patent and that said Letters Patent is hereby corrected as shown below:

ON THE COVER PAGE, at [56] REFERENCES CITED

Under OTHER PUBLICATIONS,

"no" should read --on--.
"Uing" should read --Using--.

COLUMN 1

Line 35, "cost;" should read --cost.--.
Line 42, "etc." should read --etc.,--.
Line 47, "Blodaett" should read --Blodgett--.
Line 57, "element" should read --elements--.
Line 58, "et al," should read --et al.,--.
Line 61, "et al," should read --et al.,--.
Line 62, "et al," should read --et al.,--.

COLUMN 2

Line 4, "has" should read --have--.
Line 25, "Therefore" should read --Therefore,--.
Line 29, "been also" should read --also been--.
Line 60, "etc." should read --etc.,--.

UNITED STATES PATENT AND TRADEMARK OFFICE
CERTIFICATE OF CORRECTION

PATENT NO. : 5,812,516
DATED : September 22, 1998
INVENTOR(S): HIROYASU NOSE, ET AL.

It is certified that error appears in the above-identified patent and that said Letters Patent is hereby corrected as shown below:

COLUMN 3

Line 1, "to" should read --to an--.
    Line 60, "he" should read --the--.

COLUMN 5

Line 16, "of" should read --of the--.
    Line 31, "ring" should read --rings--.

COLUMN 6

Line 32, "group" should read --groups--.
    Line 33, "group" should read --groups--, and "having" should read --having a--.

COLUMN 7

"=CII—C" should read -- =CH—C --.

UNITED STATES PATENT AND TRADEMARK OFFICE
CERTIFICATE OF CORRECTION

PATENT NO. : 5,812,516

DATED : September 22, 1998

INVENTOR(S): HIROYASU NOSE, ET AL.

It is certified that error appears in the above-identified patent and that said Letters Patent is hereby corrected as shown below:

COLUMN 10 - Example 1

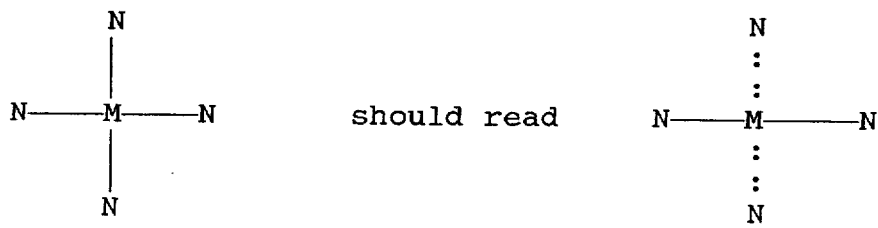

and in Examples 1 and 2, "rear earth" should read
--rare earth--.

COLUMN 11

Line 38, Insert --1) -- before example
    Line 47, Insert --2) -- before example
    Line 55, Insert --3) -- before example

COLUMN 12

Line 25, Insert --4) -- after example line 5, change "rear earth" to --rare earth--.

UNITED STATES PATENT AND TRADEMARK OFFICE
CERTIFICATE OF CORRECTION

PATENT NO. : 5,812,516

DATED : September 22, 1998

INVENTOR(S): HIROYASU NOSE, ET AL.

It is certified that error appears in the above-identified patent and that said Letters Patent is hereby corrected as shown below:

COLUMN 13

Line 29, "be" should read --also--.
Line 30,, "also" should read --be--.
Line 52, "Adesired" should read --A desired--.
Line 56, "in" should read --in the--.

COLUMN 14

Line 26, "dippig" should read --dipping--.

COLUMN 15

Line 4, "forming" should read --forming an--.
Line 38, "electrode" should read --electrode and--.

COLUMN 16

Line 5, "the" (first occurrence) should be deleted.
Line 12, "invention" should read --invention.--.
Line 45, "5nm,/min." should read --5mm/min.--.

COLUMN 17

Line 17, "the" should read --the tunnel--.
Line 45, "Z-axis" should read --Z-axis of--.
Line 54, "warped," should read --warped.--.

UNITED STATES PATENT AND TRADEMARK OFFICE
CERTIFICATE OF CORRECTION

PATENT NO. : 5,812,516

DATED : September 22, 1998

INVENTOR(S): HIROYASU NOSE, ET AL.

It is certified that error appears in the above-identified patent and that said Letters Patent is hereby corrected as shown below:

COLUMN 18

Line 49, "being" should read --being a--.

COLUMN 19

Line 48, "other" should read --others--.
Line 59, "be also" should read --also be--.
Table 1, "SOAZ" should read --SQAZ--.

COLUMN 20

Line 47, "be also" should read --also be--.